United States Patent
Julienne et al.

(10) Patent No.: US 10,054,133 B2
(45) Date of Patent: Aug. 21, 2018

(54) METHOD FOR REDUCING THE NOISE LEVEL OF A TURBOMACHINE FAN

(71) Applicant: SNECMA, Paris (FR)

(72) Inventors: Francois Julienne, Moissy-Cramayel (FR); Nicolas Courtiade, Moissy-Cramayel (FR); Jean-Michel Roux, Moissy-Cramayel (FR)

(73) Assignee: SNECMA, Paris (FR)

( * ) Notice: Subject to any disclaimer, the term of this patent is extended or adjusted under 35 U.S.C. 154(b) by 299 days.

(21) Appl. No.: 14/958,175

(22) Filed: Dec. 3, 2015

(65) Prior Publication Data

US 2016/0160879 A1 Jun. 9, 2016

(30) Foreign Application Priority Data

Dec. 4, 2014 (FR) ...................... 14 61938

(51) Int. Cl.
 *F04D 29/66* (2006.01)
 *F04D 27/02* (2006.01)
 (Continued)

(52) U.S. Cl.
 CPC .......... *F04D 29/667* (2013.01); *B64C 11/301* (2013.01); *F04D 27/001* (2013.01); *F04D 27/0246* (2013.01); *F04D 29/325* (2013.01); *F04D 29/362* (2013.01); *F04D 29/666* (2013.01)

(58) Field of Classification Search
 CPC ...... F04D 29/36; F04D 29/362; F04D 29/364; F04D 29/66; F04D 29/661; F04D 29/666; F04D 29/667; F04D 27/001; F04D 27/0246; B64C 11/301; B64C 11/30; B64C 11/32; F05D 2260/96; F05D 2240/302; F01D 7/00; F01D 7/02
 See application file for complete search history.

(56) References Cited

U.S. PATENT DOCUMENTS 3,747,343 A * 7/1973 Rosen ...................... F02K 3/06
                                                                                   415/119
5,452,988 A * 9/1995 Short ...................... B64C 11/32
                                                                                   416/151
(Continued)

OTHER PUBLICATIONS

Preliminary Search Report dated Aug. 4, 2015 in French Patent Application No. FR 1461938 (with English translation of Categories of Cited Documents).

*Primary Examiner* — Woody Lee, Jr.
*Assistant Examiner* — Elton Wong
(74) *Attorney, Agent, or Firm* — Oblon, McClelland, Maier & Neustadt, L.L.P

(57) ABSTRACT

A method for reducing the noise level generated by a fan of a turbomachine including a plurality of vanes, said method further including, when the turbomachine is operating and under given flight conditions, the following steps measuring an operational pitch angle for each of the vanes, calculating an offset between the operational pitch angle of each of the vanes and a predetermined reference pitch angle for the given flight conditions so as to produce a controlled noise level at multiple rotation frequencies of the fan, correcting the orientation of the vanes so as to compensate their operational pitch angles depending on the offsets thus calculated.

9 Claims, 6 Drawing Sheets

(51) Int. Cl.
*B64C 11/30* (2006.01)
*F04D 29/32* (2006.01)
*F04D 29/36* (2006.01)
*F04D 27/00* (2006.01)

(56) References Cited

U.S. PATENT DOCUMENTS

| | | | | |
|---|---|---|---|---|
| 5,966,525 | A * | 10/1999 | Manzi, Jr. | F01D 5/10 |
| | | | | 415/119 |
| 6,672,835 | B1 | 1/2004 | Hughes | |
| 2006/0029493 | A1* | 2/2006 | Schwaller | F02C 7/045 |
| | | | | 415/119 |
| 2011/0231171 | A1* | 9/2011 | Jousselin | G06F 17/5009 |
| | | | | 703/7 |
| 2011/0277447 | A1 | 11/2011 | Stürmer | |
| 2013/0230383 | A1* | 9/2013 | Todorovic | F01D 5/3007 |
| | | | | 415/13 |
| 2014/0064968 | A1* | 3/2014 | Negulescu | B64C 11/18 |
| | | | | 416/128 |

* cited by examiner

METHOD FOR REDUCING THE NOISE LEVEL OF A TURBOMACHINE FAN

GENERAL TECHNICAL FIELD

The present application relates to vanes of a turbomachine, particularly to vanes of the fan of a turbomachine. More precisely, the present application relates to a method for reducing the sound level generated by a fan of a turbomachine in operation.

PRIOR ART

A turbomachine generally comprises, from upstream to downstream in the gas flow direction, a fan, one or more compressor stages, for example a low-pressure compressor and a high-pressure compressor, a combustion chamber, one or more turbine stages, for example a high-pressure turbine and a low-pressure turbine, and a gas exhaust nozzle.

Conventionally, the fan is driven and supported by a rotating shaft which is connected to a disc accommodating a plurality of vanes.

These vanes, although they are designed to be identical, actually have in reality, due to their manufacture, slight geometrical differences. To mitigate this problem, prior to assembling the vanes on the rotating shaft, the geometric characteristics of each of the vanes are measured in cold conditions, that is before assembling the vanes on the disc, so as to determine a certain number of criteria such as for example the mechanical moment of each of the vanes.

These criteria are then used to determine the sorting of the vanes, that is the order in which the vanes are assembled to the rotating shaft, with the aim of insuring for example the mechanical and acoustic balance of the fan.

Among the geometric characteristics measured in cold conditions are found in particular the pitch angle of each of the vanes which, still due to the dispersion in manufacturing the blades, varies slightly from one vane to another.

Recent tests, however, have made it possible to demonstrate that measuring the pitch angle of each vane in cold conditions is necessary but not sufficient for predicting their behavior when hot, that is once the vanes are assembled to the disc and the turbomachine is operating. Indeed, once the turbomachine is operating and the vanes are in rotation and aerodynamically loaded, the variations in pitch angle between two adjoining vanes can still change to the degree that the geometric differences between the vanes can bring about behavior when hot, particularly untwisting and elongation but also vibrations, that is different from one vane to another. This problem is particularly pronounced in the case of vanes made of composite material.

At high engine speed, particularly when the fan passes into the transonic regime, the relative speed of the fan is subsonic at the root of the vane and supersonic at the vane tip, which generates shock waves at the vane tips by transition to supersonic speed. However, the pitch offsets between two adjoining vanes induce irregularities in the structure of these shock waves which result in the appearance of noise at frequencies called RMF (rotation multiple frequencies) of the fan. The appearance of noise at RMF frequencies is illustrated in FIGS. 1a and 1b in which are shown example of noise spectra of a turbomachine fan, respectively at low engine speed and high engine speed. At low engine speed, it is observed that the fan generates noise primarily at frequencies corresponding to so-called BPF frequencies (blade passing frequency). On the other hand, at high engine speed, it is observed that the fan will emit noise at RMF frequencies, that is at multiples of the frequency of rotation of the fan, in addition to noise at BPF frequencies.

Due to conservation of acoustic energy, the appearance of noise at RMF frequencies makes it possible to generally decrease noise at BPF frequencies. However, near a range of critical frequencies, for example a range of frequencies to be avoided with respect to the sensitivity of the human ear or to a regulatory constraint, the presence of RMF implies that there is a risk that a portion of the acoustic energy may attain these particularly penalizing frequencies.

There exists therefore a need to control the noise emitted at these RMF, so as to reduce the sound level generated by said fan.

PRESENTATION OF THE INVENTION

The present invention responds to this need by proposing a method wherein, when the turbomachine is in operation at given flight conditions, an operational pitch angle of each vane is changed so as to approach a predetermined reference pitch angle for the given flight conditions, so that the vanes produce a controlled level of noise at RMF frequencies, said controlled noise level being designed to reduce the level of noise generated by the fan, at least at certain frequencies.

More precisely, the present invention has as its object a method for reducing the level of noise generated by a turbomachine fan comprising a plurality of vanes, said method comprising, when the turbomachine is in operation and at the given flight conditions, the following steps consisting of:
  measuring an operational pitch angle for each of the vanes,
  calculating an offset between the operational pitch angle of each of the vanes and a predetermined reference pitch angle for the given flight conditions so that the vanes produce a controlled noise level at rotation multiple frequencies of the fan,
  correcting the orientation of the vanes so as to compensate their operational pitch angles depending on the offsets thus calculated.

In this manner, the fan generates a controlled noise level at rotation multiple frequencies, thereby reducing its noise level, at least at certain frequencies.

Preferably, the operational pitch angle of each of the vanes is corrected individually for each vane.

Preferably, the operational pitch angle is measured at the tip of each vane. More preferably, each vane comprising a leading edge and a trailing edge, and the operational pitch angle of each of the vanes is measured using the following operations of:
  detecting in real time the passage of the leading edge of each vane,
  detecting in real time the passage of the trailing edge of each vane, and
  measuring the engine speed of the turbomachine.

Preferably, the operational pitch angle of a vane is corrected when the offset is greater than a threshold of about 0.05 degrees.

According to a first aspect of the invention, the controlled noise level at the rotation multiple frequencies corresponds to a generally decreased level of noise at said rotation multiple frequencies.

According to a second aspect of the invention, the controlled noise level at the rotation multiple frequencies corresponds to a generally equalized noise level at said rotation multiple frequencies.

The invention also has as its object a turbomachine fan comprising a plurality of vanes, comprising means for implementation of the method as described previously, said fan comprising:

- a measuring device configured to measure an operating pitch angle for each of the vanes, when the turbomachine is operating and at the given flight conditions,
- a calculator configured to calculate an offset between the operating pitch angle of each of the vanes and a predetermined reference pitch angle for the given flight conditions so that the vanes produce a controlled noise level at rotation multiple frequencies of the fan, and
- an angular adjustment device configured to correct the orientation of the vanes controlled so as to compensate their operating pitch angles depending on the calculated offsets.

The invention also has as its object a turbomachine having a fan like that previously described.

PRESENTATION OF THE FIGURES

Other features, aims and advantages of the invention will be revealed by the description that follows, which is purely illustrative and not limiting, and which must be read with reference to the appended drawings, wherein.

DETAILED DESCRIPTION

Figure 1A:
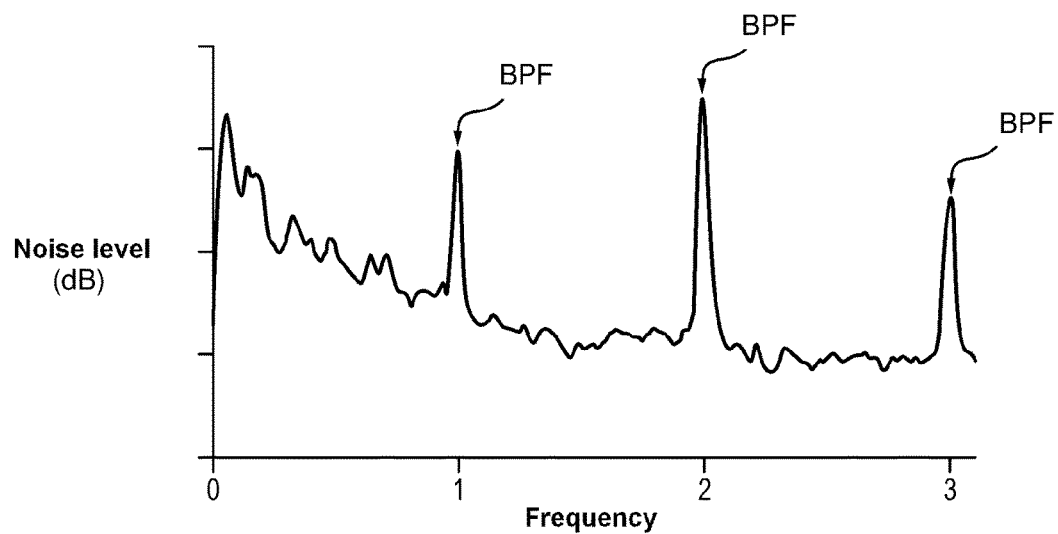
FIGS. 1a and 1b (already described) show respectively the noise spectrum of a turbomachine fan at low engine speed and at high engine speed.
Figure 1B:
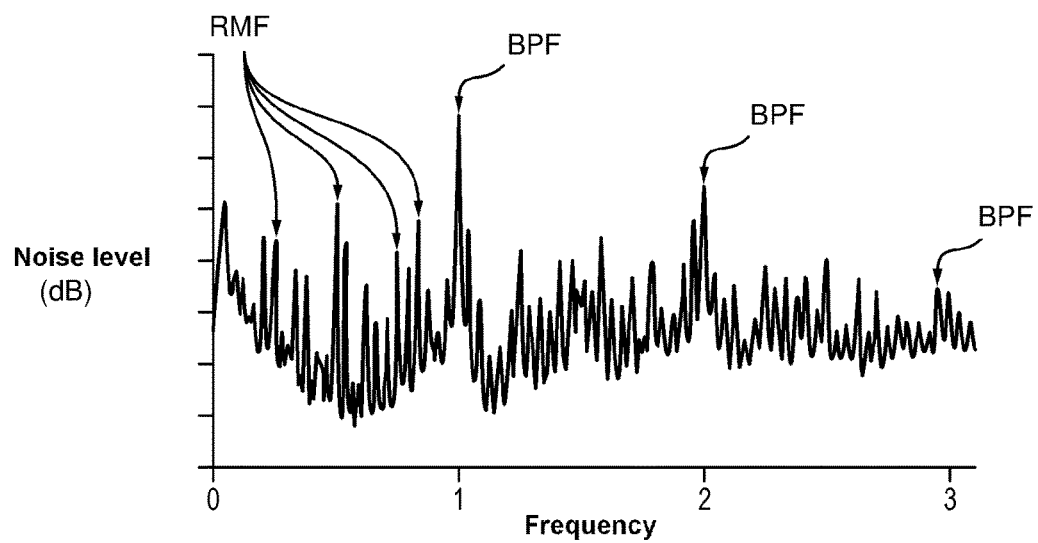
Figure 2:
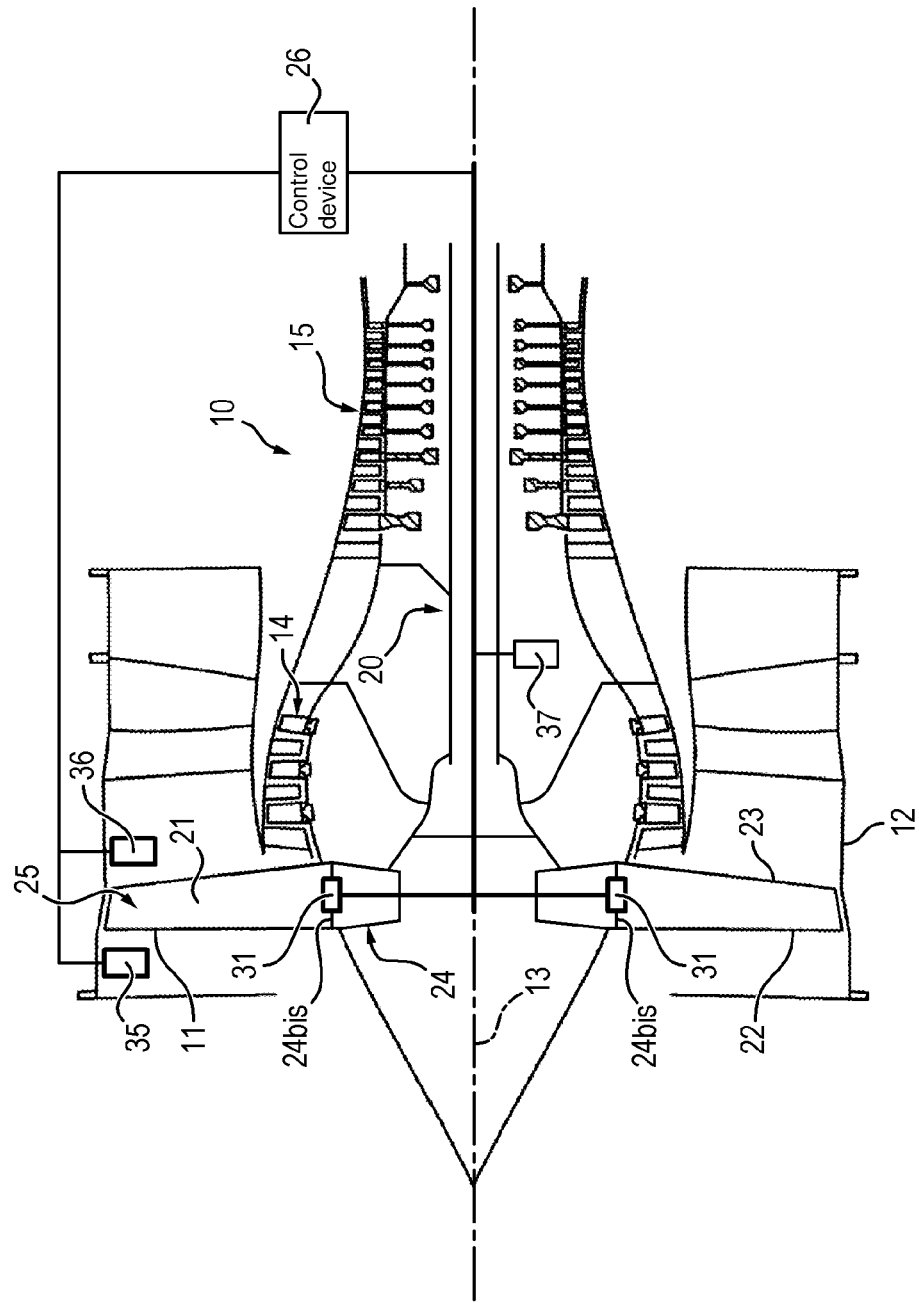
FIG. 2 shows schematically, in longitudinal section, a turbomachine according to one embodiment of the invention.

FIG. 2 shows an example of an aircraft turbomachine 10 comprising means of implementing a method 100 for reducing the sound level generated by the turbomachine 10, particularly by a fan 11 of the turbomachine 10, according to an embodiment of the invention.

The turbomachine 10 comprises a nacelle 12 extending along a longitudinal axis 13 and within which are provided, from upstream to downstream in the gas flow direction, the fan 11, a low-pressure compressor 14, a high-pressure compressor 15, a combustion chamber, a high-pressure turbine, a low-pressure turbine and a gas exhaust nozzle, not shown.

The fan 11 is driven and supported by a disc 24 connected to a rotating shaft 20. The disc 24 supports pitch setting devices 31 of each vane 21.

The vanes 21 are ordered around the disc 24 according to a sorting defining an ordering ORD of said vanes 21 around the disc 24.

The vanes 21 have, from upstream to downstream in the direction of gas flow, a leading edge 22 and a trailing edge 23.

Each vane 21 also has a vane root 24b is corresponding to the end of the vane 21 supported by the pitch changing device 31 and a vane tip 25 corresponding to its opposite end, facing the nacelle 12 of the turbomachine 10.

Figure 3:
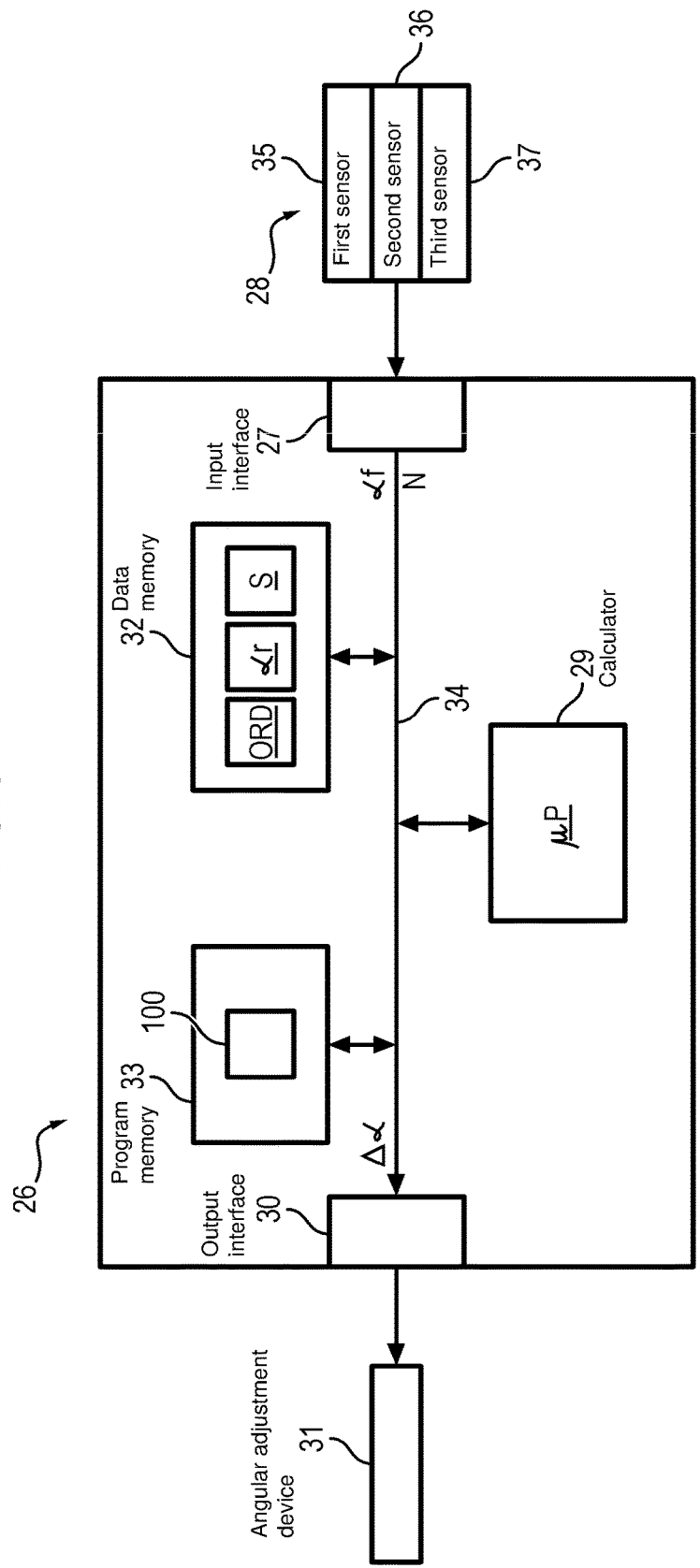
FIG. 3 shows schematically a control device of the turbomachine illustrated in FIG. 2.

The turbomachine 10 is further equipped with a control device 26 of which FIG. 3 is a schematic representation. The control device 26 comprises:

- an input interface 27 connected to a measuring device 28 configured to measure an operating pitch angle $\alpha f$ for each vane 21, when the machine is operating and at given flight conditions. What is meant by "pitch angle" is the angle between the chord of the profile of the vane 21 and the longitudinal axis 13. What is meant by "chord" is a straight line segment connecting the leading edge 22 to the trailing edge 23 of a vane 21, at a given height of the vane 21 relative to the longitudinal axis 13. This given height is for example taken at the tip 25 of the vane 21. The given flight conditions are for example an engine speed N of the rotating shaft 20 of the fan 11 (or low-pressure shaft) and/or a phase of flight of the aircraft, in particular takeoff and/or initial climb of the aircraft,
- a calculator 29 configured to calculate an offset $\Delta\alpha$ between the operating pitch angle $\alpha f$ of each vane 21 and a predetermined reference pitch angle $\alpha r$ for these given flight conditions so that the vanes 21 produce a controlled noise level at the RMF frequencies of the fan 11,
- an output interface 30 connected to an angular adjustment device 31 configured to adjust the operational pitch angle $\alpha f$ of the vanes 21 so as to compensate the offset $\Delta\alpha$ calculated by the calculator 29. In this manner, the fan 11 generates the controlled noise level at the RMF frequencies, thereby reducing the level of noise that it generates.

The control device 26 further comprises:

- a data memory 32 wherein for example the ordering ORD of the vanes 21 and the reference pitch angle $\alpha r$ are pre-recorded, as well as a threshold S used by the calculator 29 as described hereafter,
- a program memory 33 wherein for example the method 100 for reducing the level of noise generated by the fan 11 is pre-recorded, and
- at least one communication bus 34.

A person skilled in the art will understand that the reference pitch angle $\alpha r$ is for example previously determined by numerical simulation of a fan similar to the fan 11. The reference pitch angle $\alpha r$ is for example determined previously for different flight conditions, particularly for different engine speeds N and/or for different phases of flight. In this case, the calculator 29 will select, for calculating the offset $\Delta\alpha$, the reference pitch angle $\alpha_r$ depending on the flight conditions of the aircraft.

The measuring device 28 is for example of the type known by the term "tip timing." For this purpose, the measuring device 28 comprises for example:

- a first sensor 35 configured to detect in real time the passage of the leading edge 22 of the tip 25 of each vane 21,
- a second sensor 36 configured to detect in real time the passage of the trailing edge 23 of the tip 25 of each vane 21, and
- a third sensor 37 configured to measure the engine speed N of the rotating shaft 20 of the fan 11 of the turbomachine 10.

The first and second sensors 35, 36 are for example positioned on the inner wall of the nacelle 12 respectively upstream and downstream of the fan 11, facing the vanes 21, so as to detect the passage of the leading edge 22 and of the trailing edge 23 at the tip 25 of each vane 21. The third sensor 37 is for example configured to detect in real time the passage of an element integrated to the rotating shaft 20 for the purpose of calculating the engine speed. In this case, the calculator 29 is also configured to:

- calculate the operating pitch angle of based on the measurements carried out by the first and second sensors 35, 36,
- calculate the engine speed N of the turbomachine based on the measurements carried out by the third sensor 37, and
- assign each operating pitch angle αf calculated to the corresponding vane 21 based on the engine speed N determined and the ordering ORD of the vanes 21.

Preferably, the measurements carried out by the first and second sensors 35, 36 are averaged over several revolutions (several hundred revolutions for example) of the rotating shaft 20 so as to limit the consequences of noise in the measurements, and thus ensure sufficiently accurate calculation of the operational pitch angle αf of each of the vanes 21.

The angular adjustment device 31 corrects the orientation of the vanes 21 for compensating the operational pitch angles αf depending on the offsets Δα calculated by the calculator 29. In particular, the device 31 is configured to correct individually the orientation of each vane 21 by having the vane rotate by the calculated offset Δα, in particular when this is too great.

The calculator 29 can for example be configured to determine whether the offset Δα between the operational pitch angle αf of each of the vanes 21 and the reference pitch angle αr is greater than the threshold S, and if this is the case, send instructions to the angular adjustment device 31 for compensating the offset Δα. The threshold S is for example 0.05 degrees.

The angular adjustment device 31 is thus configured to return the operational pitch angle αf of the tip 25 of each vane 21 into a tolerance region around the reference pitch angle αr corresponding to the reference pitch angle αr±the threshold S.

Figure 4:
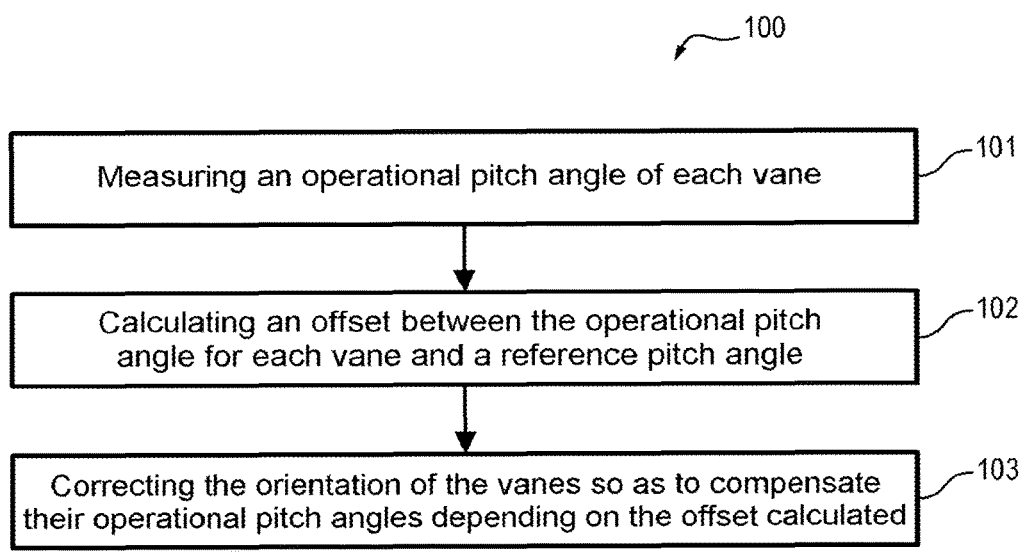
FIG. 4 shows a method for reducing the noise generated by the fan of the turbomachine illustrated in FIG. 2.

FIG. 4 shows a method 100 for reducing the level of noise generated by the fan 11 when the turbomachine 10 is operating in given flight conditions. The method 100 comprises the following steps:

- measuring 101 the operational pitch angle αf for each of the vanes 21,
- calculating 102 the offset Δα between the operational pitch angle αf of each of the vanes 21 and the predetermined reference pitch angle αr for the given flight conditions so that the vanes 21 produce a controlled noise level at the RMF frequencies of the fan 11, so as to reduce the level of noise generated by the fan 11,
- correcting 103 the orientation of the vanes 21 so as to compensate the operational pitch angle depending on the offset Δα thus calculated. In this manner, the fan 11 generates the controlled noise level at the RMF frequencies and its noise level is therefore reduced.

Preferably, the operational pitch angle αf is measured 101 at the tip 25 of the vane. For this purpose, the measurement 101 is for example accomplished by tip timing using the following operations consisting of:

- real time detection of passage of the leading edge 22 of the tip 25 of each of the vanes 21,
- real time detection of passage of the trailing edge 23 at the tip 25 of each vane 21, and
- measurement of the engine speed N of the turbomachine 10.

The operations of detecting the passage of the leading edges 22 and the trailing edges 23 of each of the vanes 21 thus make it possible to calculate the operational pitch angle αf of each of the vanes 21. The operation consisting of measuring the engine speed N of the turbomachine 10 makes it possible, in combination with knowledge of the ordering ORD of the vanes 21 around the rotating shaft 20, to assign each calculated operational pitch angle αf to the corresponding vane 21.

Preferably, the measurements carried out during detection operations are averaged over several revolutions (for example several hundred) of the rotating shaft 20 so as to limit the effect of noise in the measurements, and thus ensure a sufficiently accurate calculation of the operational pitch angle αf of each of the vanes 21.

Figure 5:
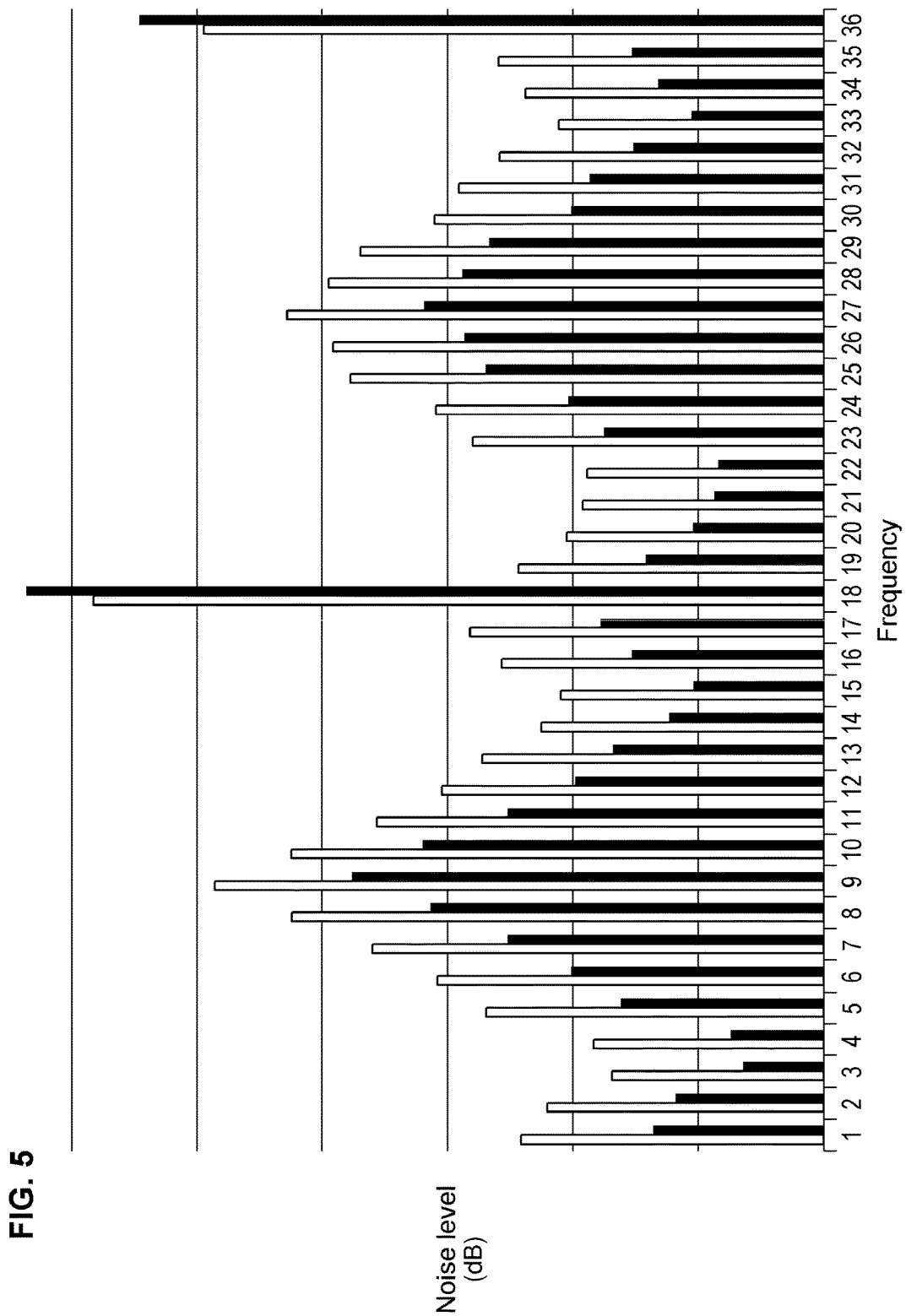
FIG. 5 shows an example of a noise spectrum of the fan of the turbomachine illustrated in FIG. 2 according to a first aspect of the invention.

According to a first aspect of the invention, the controlled noise level at the RMF frequencies corresponds to a generally reduced noise level at said RMF frequencies. The reduction of the noise level at the RMF frequencies thus makes it possible to reduce the noise level generated by the fan 11. FIG. 5 shows one example of a noise spectrum from the fan 11 with (in black) and without (in white) a controlled noise level at RMF frequencies, according to the first aspect of the invention. It is observed that, according to this first aspect of the invention, and taking into account the conservation of acoustic energy, the reduction of the noise level at RMF frequencies brings about an increase in the noise level at blade passing BPF frequencies. Such an increase in the noise level at BPF frequencies is however not a problem since the latter can be attenuated later, and much more easily than for noise at RMF frequencies, by means known to persons skilled in the art.

Figure 6:
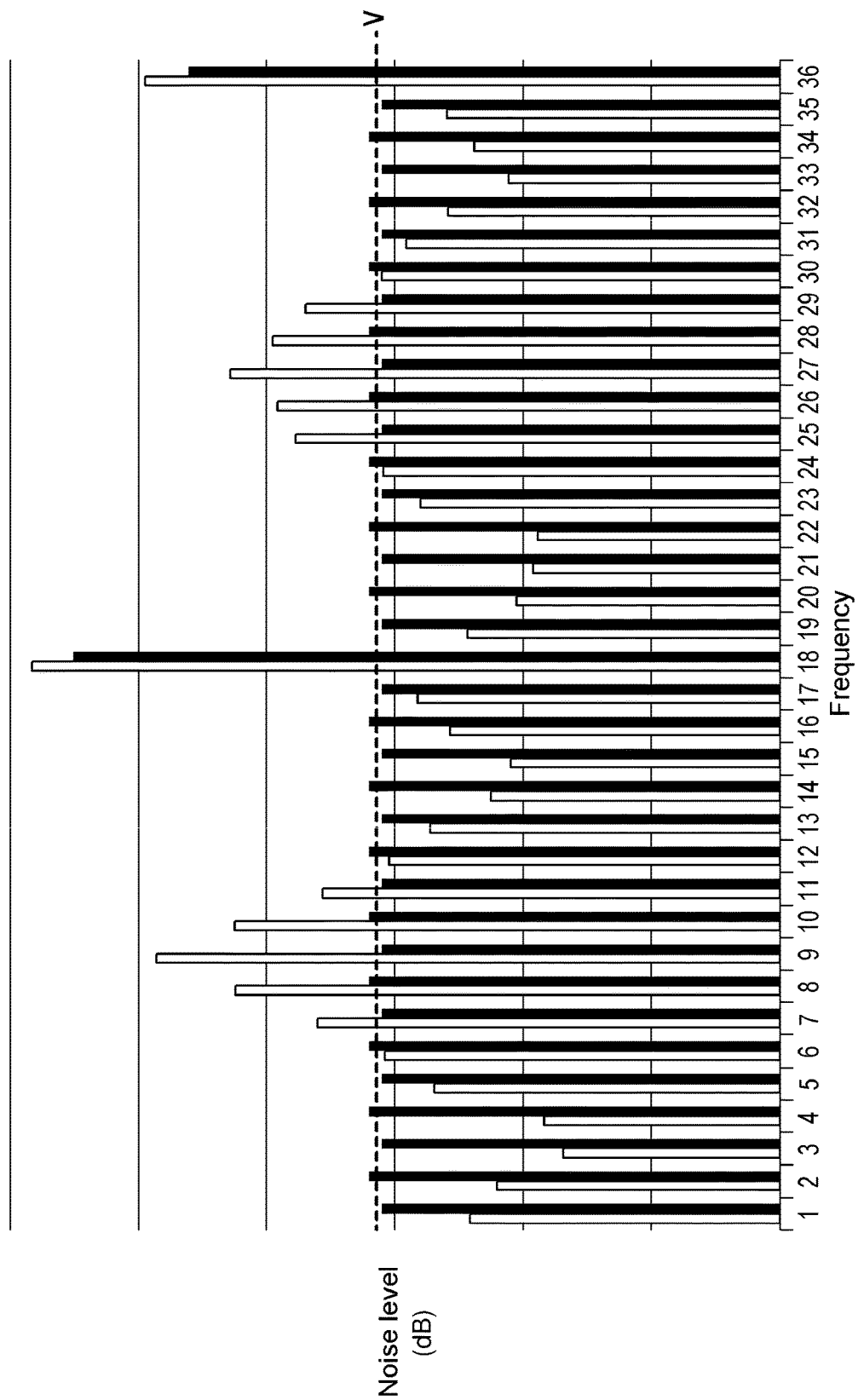
FIG. 6 shows an example of a noise spectrum of the turbomachine fan illustrated in FIG. 2 according to a second aspect of the invention.

According to a second aspect of the invention, the controlled noise level at RMF frequencies corresponds to a generally equalized noise level at said RMF. In other words, starting from the noise spectrum of the fan 11 without a controlled noise level at the RMF frequencies, the noise level at RMF frequencies is generally transformed to an intermediate value V comprised between the maximum and minimum noise levels at RMF frequencies calculated on the noise spectrum of the fan 11 without a controlled noise level at RMF frequencies. FIG. 6 shows an example of a noise spectrum of the fan 11 with (in black) and without (in white) a controlled noise level at RMF frequencies according to the second aspect of the invention. It is seen that in this case, the equalization of the noise level at RMF frequencies at the intermediate value V makes it possible, on the one hand, to attenuate the RMF having the highest noise levels and, on the other hand, taking into account the conservation of acoustic energy, to bring about a reduction in the noise level at BPF frequencies, thus reducing the noise level generated by the fan 11.

Preferably, the operational pitch angle αf of each of the vanes 21 is compensated 103 individually for each vane 21. In other words, the orientation of the vanes 21 is corrected individually for each vane 21.

For example, during step 103 consisting of correcting the orientation of the vanes 21, the operational pitch angle αf of the tip 25 of each vane 21 is brought back into the tolerance range.

For example, the operating pitch angle αf of each of the vanes 21 is compensated 103 when the offset Δα is greater than the threshold S.

The turbomachine 10 and the method 100 described above make it possible to control the noise level at RMF frequencies emitted by the fan 11 by having the operational pitch angle αf of each vane 21 vary dynamically, so as to reduce the level of noise generated by the fan 11. In this manner, it is possible to constitute a fan 11 the sorting whereof is uniquely determined to respond to mechanical balancing constraints, and to accomplish the acoustic balancing of the fan 11 later, in a dynamic manner, when the turbomachine 10 is operating. Moreover, the acoustic balancing of the fan 11 can further be accomplished when the engine speed N of the turbomachine 10 or the flight phase of the aircraft change.

Advantageously, the invention makes it possible to adjust in flight the operational pitch angle αr of each vane 21 so as to optimize the acoustic signature and the performance of the fan 11 depending on the flight phase, and therefore according to the engine speed N.

The invention claimed is:

1. A method for reducing the noise level generated by a fan of a turbomachine comprising a plurality of vanes, said method comprising, when the turbomachine is operating and in given flight conditions:
   measuring an operational pitch angle for each of the vanes;
   calculating an offset between the operational pitch angle of each of the vanes and a predetermined reference pitch angle for the given flight conditions, at which the vanes produce a controlled noise level at rotation multiple frequencies of the fan; and
   correcting an orientation of the vanes so as to compensate the operational pitch angles of the vanes depending on the calculated offsets.

2. The method according to claim 1, wherein the operational pitch angle is corrected individually for each vane.

3. The method according to claim 1, wherein the operational pitch angle is measured at the tip of each vane.

4. The method according to claim 1, wherein the operational pitch angle is measured at the tip of each vane,
   wherein each vane comprises a leading edge and a trailing edge, and
   wherein the operational pitch angle of each of the vanes is measured according to the following operations comprising:
   detecting in real time the passage of the leading edge of each vane,
   detecting in real time the passage of the trailing edge of each vane, and
   measuring of the engine speed of the turbomachine.

5. The method according to claim 1, wherein the operational pitch angle of each vane is compensated when the offset is greater than a threshold of 0.05 degrees.

6. The method according to claim 1, wherein the controlled noise level at the rotation multiple frequencies corresponds to a generally reduced noise level at said rotation multiple frequencies compared to the noise level at said rotation multiple frequencies without a controlled noise level at said rotation multiple frequencies.

7. The method according to claim 1, wherein the controlled noise level at rotation multiple frequencies corresponds to a generally equalized noise level at said rotation multiple frequencies compared to the noise level at said rotation multiple frequencies without a controlled noise level at said rotation multiple frequencies.

8. A fan of a turbomachine comprising:

a plurality of vanes; and a device comprising:

a measuring device configured to measure an operational pitch angle for each of the vanes, when the turbomachine is operating and in given flight conditions, a calculator configured to calculate an offset between the operational pitch angle of each of the vanes and a predetermined reference pitch angle for said given flight conditions, at which the vanes produce a controlled noise level at rotation multiple frequencies of the fan, and an angular adjustment device configured to correct an orientation of the vanes so as to compensate the operational pitch angles of the vanes depending on the calculated offsets.

9. A turbomachine comprising a fan comprising:

a plurality of vanes; and a device comprising:

a measuring device configured to measure an operational pitch angle for each of the vanes, when the turbomachine is operating and in given flight conditions, a calculator configured to calculate an offset between the operational pitch angle of each of the vanes and a predetermined reference pitch angle for said given flight conditions, at which the vanes produce a controlled noise level at rotation multiple frequencies of the fan, and an angular adjustment device configured to correct an orientation of the vanes so as to compensate the operational pitch angles of the vanes depending on the calculated offsets.

* * * * *